US012366166B2

(12) United States Patent
Dorsamy et al.

(10) Patent No.: US 12,366,166 B2
(45) Date of Patent: Jul. 22, 2025

(54) TAILORING ROTOR BLADE COATING TO TUNE GAS TURBINE ENGINE BLADED ROTOR

(71) Applicant: Pratt & Whitney Canada Corp., Longueuil (CA)

(72) Inventors: Yashiva Dorsamy, St Hubert (CA); Philippe Boyer, Saint Isidore (CA); Jasrobin Grewal, Pincourt (CA); Prakul Mittal, Longueuil (CA); Domenico Di Florio, Saint Lazare (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 47 days.

(21) Appl. No.: 18/388,259

(22) Filed: Nov. 9, 2023

(65) Prior Publication Data

US 2025/0154871 A1 May 15, 2025

(51) Int. Cl.

*F01D 5/10* (2006.01)
*F01D 5/16* (2006.01)
*F01D 5/28* (2006.01)
*F01D 5/34* (2006.01)

(52) U.S. Cl.

CPC ................. *F01D 5/10* (2013.01); *F01D 5/16* (2013.01); *F01D 5/288* (2013.01); *F01D 5/34* (2013.01); *F05D 2240/303* (2013.01); *F05D 2240/304* (2013.01)

(58) Field of Classification Search

CPC ... F01D 5/10; F01D 5/288; F01D 5/34; F05D 2230/90; F05D 2240/303; F05D 2240/304
See application file for complete search history.

(56) References Cited

U.S. PATENT DOCUMENTS

| | | | | |
|---|---|---|---|---|
| 3,758,233 | A * | 9/1973 | Cross | C23C 4/02 416/500 |
| 8,656,589 | B2 | 2/2014 | Kurt-Elli | |
| 10,689,987 | B2 | 6/2020 | Veitch | |
| 2019/0085708 | A1 | 3/2019 | Veitch | |
| 2021/0301670 | A1 * | 9/2021 | Jasper | F01D 5/288 |
| 2024/0317386 | A1 * | 9/2024 | Jodet | B64C 11/48 |

FOREIGN PATENT DOCUMENTS

| | | | |
|---|---|---|---|
| RU | 2317419 | C2 | 2/2008 |
| WO | 2023138887 | A1 | 7/2023 |

OTHER PUBLICATIONS

EP Search Report for EP Patent Application No. 24211880.0 dated Feb. 10, 2025.

* cited by examiner

*Primary Examiner* — Courtney D Heinle
*Assistant Examiner* — Andrew Thanh Bui
(74) *Attorney, Agent, or Firm* — Getz Balich LLC

(57) ABSTRACT

An apparatus is provided for a gas turbine engine. This apparatus includes a bladed rotor rotatable about an axis. The bladed rotor includes a rotor disk and a plurality of rotor blades projecting radially out from the rotor disk. The rotor blades are arranged circumferentially around the rotor disk in an array. The array of the rotor blades are divided into a plurality of sectors including a first sector and a second sector. The rotor blades are disposed in the first sector including a plurality of first rotor blades. Each of the first rotor blades includes a first coating. The rotor blades are disposed in the second sector including a plurality of second rotor blades. Each of the second rotor blades includes a second coating that is different from the first coating.

18 Claims, 9 Drawing Sheets

TAILORING ROTOR BLADE COATING TO TUNE GAS TURBINE ENGINE BLADED ROTOR

TECHNICAL FIELD

This disclosure relates generally to a gas turbine engine and, more particularly, to a bladed rotor for the gas turbine engine.

BACKGROUND INFORMATION

A gas turbine engine includes multiple bladed rotors. Various types and configurations of bladed rotors are known in the art, including integrally bladed rotors (IBRs). While these known bladed rotors have various benefits, there is still room in the art for improvement.

SUMMARY

According to an aspect of the present disclosure, an apparatus is provided for a gas turbine engine. This apparatus includes a bladed rotor rotatable about an axis. The bladed rotor includes a rotor disk and a plurality of rotor blades projecting radially out from the rotor disk. The rotor blades are arranged circumferentially around the rotor disk in an array. The array of the rotor blades are divided into a plurality of sectors including a first sector and a second sector. The rotor blades are disposed in the first sector including a plurality of first rotor blades. Each of the first rotor blades includes a first coating. The rotor blades are disposed in the second sector including a plurality of second rotor blades. Each of the second rotor blades includes a second coating that is different from the first coating.

According to another aspect of the present disclosure, another apparatus is provided for a gas turbine engine. This apparatus includes a bladed rotor rotatable about an axis. The bladed rotor includes a rotor disk and a plurality of rotor blades projecting radially out from the rotor disk. Each of the rotor blades includes an airfoil and a coating over the airfoil. The rotor blades are arranged circumferentially around the rotor disk into a plurality of blade groupings including a first blade grouping and a second blade grouping. The coating of each of the rotor blades in the first blade grouping have a first configuration. The coating of each of the rotor blades in the second blade grouping has a second configuration that is different than the first configuration.

According to still another aspect of the present disclosure, another apparatus is provided for a gas turbine engine. This apparatus includes a bladed rotor rotatable about an axis. The bladed rotor includes a rotor disk and a plurality of rotor blades arranged circumferentially around and connected to the rotor disk. The rotor blades includes a first rotor blade, a second rotor blade and a third rotor blade arranged circumferentially between and neighboring the first rotor blade and the second rotor blade. The first rotor blade includes a first coating. The second rotor blade includes a second coating that is different than the first coating. The third rotor blade includes a third coating that is identical to the first coating.

The rotor blades may also include a fourth rotor blade. The second rotor blade may be arranged circumferentially between and neighbor the third rotor blade and the fourth rotor blade. The fourth rotor blade may include a fourth coating that is identical to the second coating.

Each of the rotor blades may have a reference location. The first coating may have a first thickness at the reference location. The second coating may have a second thickness at the reference location that is different than the first thickness. The third coating may have a third thickness at the reference location that is equal to the first thickness.

The first coating may be configured from or otherwise include a first material. The second coating may be configured from or otherwise include a second material that is different than the first material.

Each of the rotor blades may have a reference location. The first coating may have a first thickness at the reference location. The second coating may have a second thickness at the reference location that is different than the first thickness.

Each of the rotor blades may project radially out from the rotor disk to a tip. The reference location may be disposed at the tip.

Each of the rotor blades may project radially out from the rotor disk to a tip. The reference location may be an intermediate location between the rotor disk and the tip.

The reference location may be disposed adjacent the rotor disk.

Each of the rotor blades may extend longitudinally between a leading edge and a trailing edge. The reference location may be disposed at the leading edge.

Each of the rotor blades may extend longitudinally between a leading edge and a trailing edge. The reference location may be disposed at the trailing edge.

Each of the rotor blades may extend longitudinally between a leading edge and a trailing edge. The reference location may be an intermediate location between the leading edge and the trailing edge.

The first coating may be uniformly applied with each of the plurality of first rotor blades. In addition or alternatively, the second coating may be uniformly applied with each of the second rotor blades.

The first coating may be uniformly applied with each of the first rotor blades. The second coating may be non-uniformly applied with each of the second rotor blades.

The first sector may be disposed circumferentially adjacent the second sector.

Each of the sectors may include a common number of the rotor blades.

The first sector may be one of a plurality of first sectors. The second sector may be one of a plurality of second sectors. The second sectors may be interspersed with the first sectors about the axis in a repeating pattern.

The bladed rotor may be configured as an integrally bladed rotor.

The bladed rotor may be configured as a turbine rotor for the gas turbine engine.

The apparatus may also include a compressor section, a combustor section, a turbine section and a flowpath extending through the compressor section, the combustor section and the turbine section from an inlet into the flowpath to an exhaust from the flowpath. The turbine section may include the bladed rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
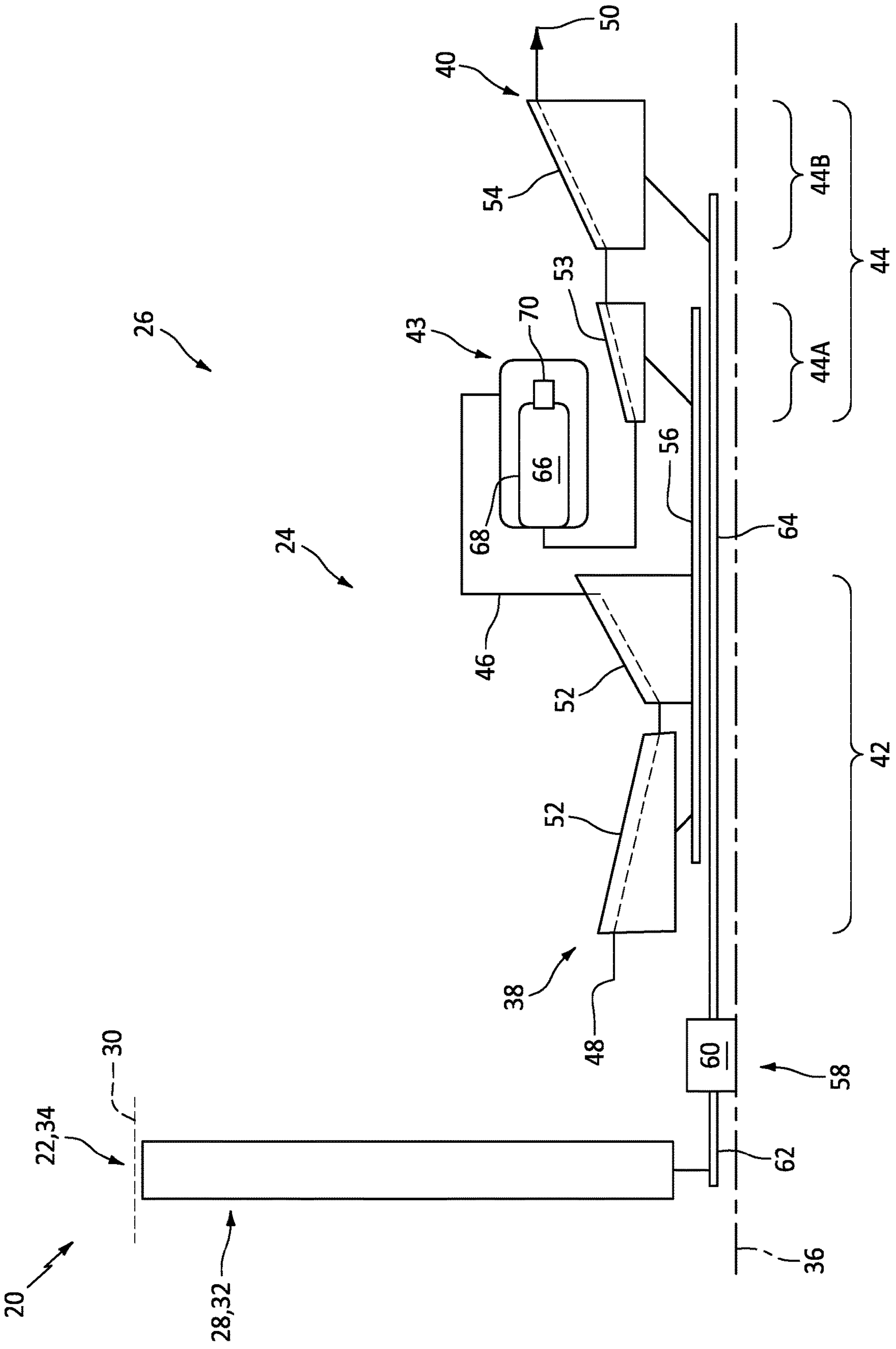
FIG. 1 is a partial side schematic illustration of a powerplant for an aircraft.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion system for the aircraft. The powerplant 20 may also or alternatively be configured as, or otherwise included as part of, an electrical power system for the aircraft. The powerplant 20 of the present application, however, is not limited to aircraft applications. The powerplant 20, for example, may alternatively be configured as, or otherwise included as part of, an industrial gas turbine engine for a land-based electrical powerplant. The powerplant 20 of FIG. 1 includes a mechanical load 22 and a core 24 of a gas turbine engine 26.

The mechanical load 22 may be configured as or otherwise include a rotor 28 mechanically driven and/or otherwise powered by the engine core 24. This driven rotor 28 may be a bladed propulsor rotor (e.g., an air mover) where the powerplant 20 is (or is part of) the aircraft propulsion system. The propulsor rotor may be an open (e.g., unducted) propulsor rotor or a ducted propulsor rotor housed within a duct 30; e.g., a fan duct. Examples of the open propulsor rotor include a propeller rotor for a turboprop gas turbine engine, a rotorcraft rotor (e.g., a main helicopter rotor) for a turboshaft gas turbine engine, a propfan rotor for a propfan gas turbine engine, and a pusher fan rotor for a pusher fan gas turbine engine. An example of the ducted propulsor rotor is a fan rotor 32 for a turbofan gas turbine engine. The present disclosure, however, is not limited to the foregoing exemplary propulsor rotor arrangements. Moreover, the driven rotor 28 may alternatively be a generator rotor of an electric power generator where the powerplant 20 is (or is part of) the aircraft power system; e.g., an auxiliary power unit (APU) for the aircraft. However, for ease of description, the mechanical load 22 is described below as a fan section 34 of the gas turbine engine 26, and the driven rotor 28 is described below as the fan rotor 32 within the fan section 34.

The gas turbine engine 26 extends axially along an axis 36 between and to an upstream end of the gas turbine engine 26 and a downstream end of the gas turbine engine 26. This axis 36 may be a centerline axis of any one or more of the powerplant members 24, 26 and 28. The axis 36 may also or alternatively be a rotational axis of one or more rotating assemblies (e.g., 38 and 40) of the gas turbine engine 26 and its engine core 24.

The engine core 24 includes a compressor section 42, a combustor section 43, a turbine section 44 and a core flowpath 46. The turbine section 44 includes a high pressure turbine (HPT) section 44A and a low pressure turbine (LPT) section 44B; e.g., a power turbine (PT) section. The core flowpath 46 extends sequentially through the compressor section 42, the combustor section 43, the HPT section 44A and the LPT section 44B from an airflow inlet 48 into the core flowpath 46 to a combustion products exhaust 50 from the core flowpath 46. The core inlet 48 of FIG. 1 is disposed towards the engine upstream end, downstream of the fan section 34 and its fan rotor 32. The core exhaust 50 of FIG. 1 is disposed at (e.g., on, adjacent or proximate) or otherwise towards the engine downstream end.

Each of the engine sections 42, 44A and 44B includes one or more respective bladed rotors 52-54. The compressor rotors 52 are coupled to and rotatable with the HPT rotor 53. The compressor rotors 52 of FIG. 1, for example, are connected to the HPT rotor 53 by a high speed shaft 56. At least (or only) the compressor rotors 52, the HPT rotor 53 and the high speed shaft 56 collectively form the high speed rotating assembly 38; e.g., a high speed spool. The fan rotor 32 is coupled to and rotatable with the LPT rotor 54. The fan rotor 32 of FIG. 1, for example, is connected to the LPT rotor 54 by a drivetrain 58. This drivetrain 58 may be configured as a geared drivetrain. The fan rotor 32 of FIG. 1, for example, is connected to a geartrain 60 by a fan shaft 62, where the geartrain 60 may be an epicyclic geartrain or another type of gear system and/or transmission. The geartrain 60 is connected to the LPT rotor 54 through a low speed shaft 64. With this arrangement, the LPT rotor 54 may rotate at a different (e.g., faster) speed than the fan rotor 32 (the driven rotor 28). At least (or only) the fan rotor 32, the LPT rotor 54, the engine shafts 62 and 64 and the geartrain 60 collectively form the low speed rotating assembly 40. In other embodiments, however, the drivetrain 58 may alternatively be configured as a direct drive system where the geartrain 60 is omitted and the LPT rotor 54 and the fan rotor 32 (the driven rotor 28) rotate at a common (the same) speed. Referring again to FIG. 1, each of the rotating assemblies 38 and 40 and its members may be rotatable about the axis 36.

During operation of the powerplant 20 and its gas turbine engine 26, air may be directed across the fan rotor 32 and into the engine core 24 through the core inlet 48. This air entering the core flowpath 46 may be referred to as "core air". The core air is compressed by the compressor rotors 52 and directed into a combustion chamber 66 (e.g., an annular combustion chamber) within a combustor 68 (e.g., an annular combustor) of the combustor section 43. Fuel is injected into the combustion chamber 66 by one or more fuel injectors 70 and mixed with the compressed core air to provide a fuel-air mixture. This fuel-air mixture is ignited and combustion products thereof flow through and sequentially cause the HPT rotor 53 and the LPT rotor 54 to rotate. The rotation of the HPT rotor 53 drives rotation of the compressor rotors 52 and, thus, the compression of the air received from the core inlet 48. The rotation of the LPT rotor 54 drives rotation of the fan rotor 32 (the driven rotor 28). Where the driven rotor 28 is configured as the propulsor rotor, the rotation of that propulsor rotor may propel additional air (e.g., outside air, bypass air, etc.) outside of the engine core 24 to provide aircraft thrust and/or lift. The rotation of the fan rotor 32, for example, propels bypass air through a bypass flowpath outside of the engine core 24 to provide aircraft thrust. However, where the driven rotor 28 is configured as the generator rotor, the rotation of that generator rotor may facilitate generation of electricity.

For ease of description, the gas turbine engine 26 is described above with an exemplary arrangement of engine sections 34, 42, 43, 44A and 44B and an exemplary arrangement of rotating assemblies 38 and 40. The present disclosure, however, is not limited to such exemplary arrangements. The compressor section 42, for example, may include a low pressure compressor (LPC) section and a high pressure compressor (HPC) section, where one or more of the compressor rotors 52 may be disposed in the HPC section and the LPC section may include a low pressure compressor (LPC) rotor coupled to the LPT rotor 54 through the low speed shaft 64. In another example, the gas turbine engine 26 and its engine core 24 may include a single rotating assembly (e.g., spool), or more than two rotating assemblies (e.g., spools).

Figure 2:
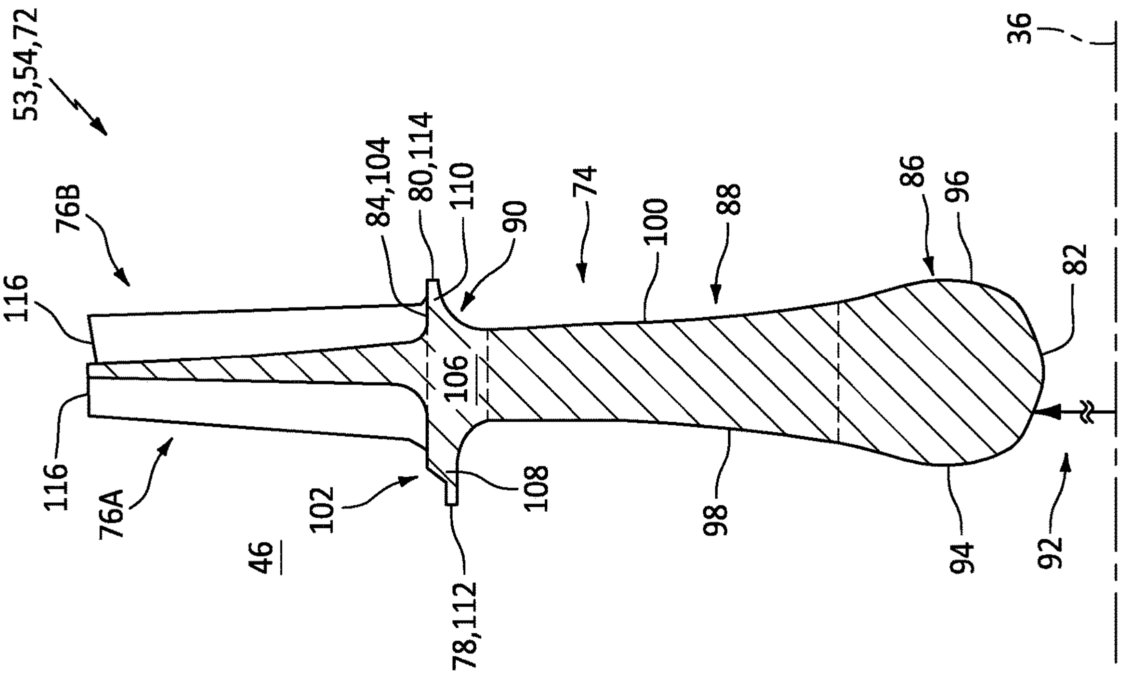
FIG. 2 is a partial side sectional illustration of an integrally bladed rotor.
Figure 3:
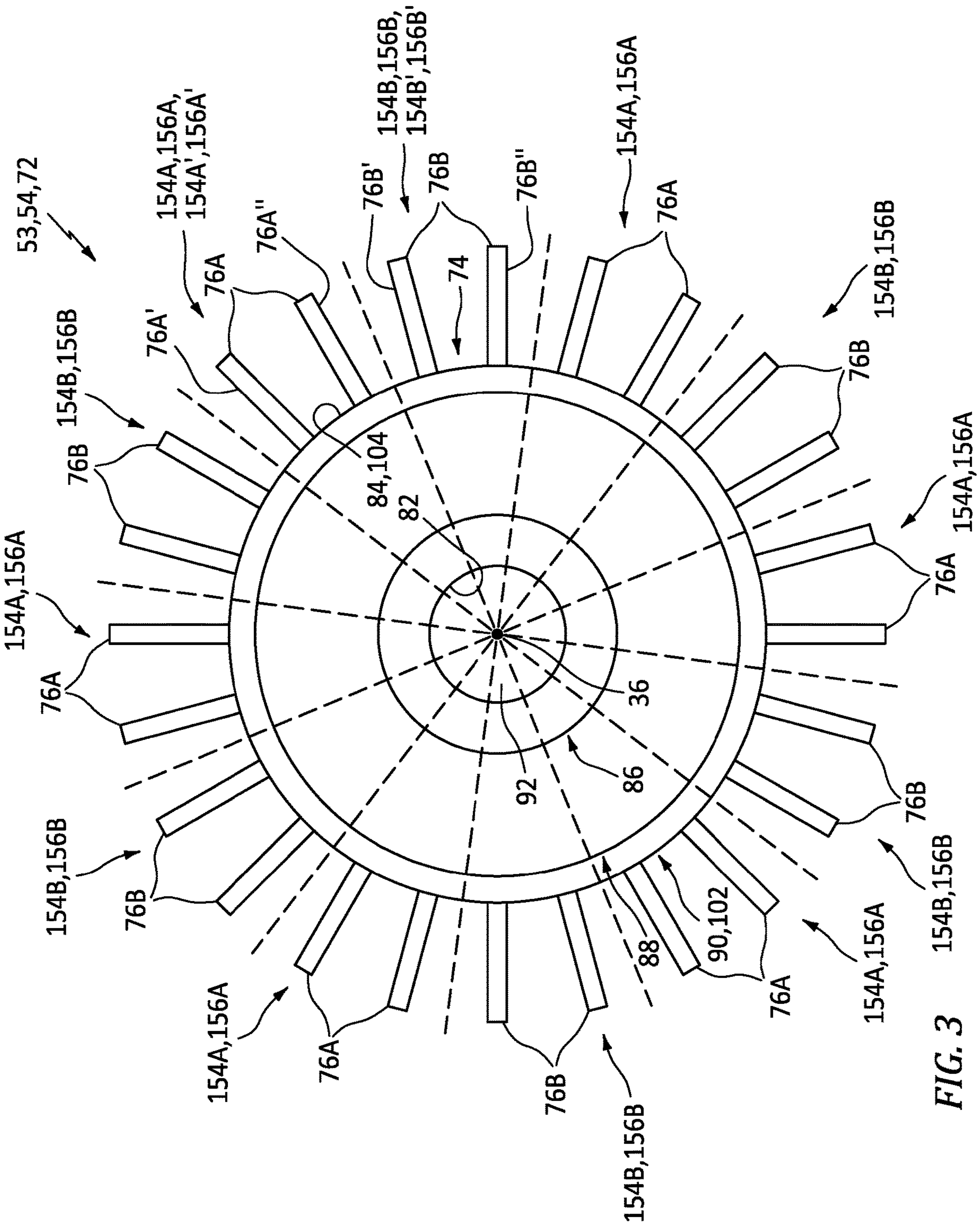
FIG. 3 is a schematic illustration of the bladed rotor.

FIG. 2 illustrates an integrally bladed rotor (IBR) 72 for the gas turbine engine 26 and its engine core 24 (see FIG. 1). The bladed rotor 72 may be configured as the HPT rotor 53 or the LPT rotor 54. However, it is contemplated these teachings may also be applied to one or more of the compressor rotors 52; see FIG. 1. Referring to FIG. 3, the bladed rotor 72 is rotatable about the axis 36. This bladed rotor 72 includes a rotor disk 74 (e.g., a turbine disk) and a plurality of rotor blades 76A and 76B (generally referred to as "76") (e.g., turbine blades).

Referring to FIG. 2, the rotor disk 74 extends axially along the axis 36 between and to an axial upstream side 78 of the bladed rotor 72 and its rotor disk 74 and an axial downstream side 80 of the bladed rotor 72 and its rotor disk 74. Here, the rotor upstream side 78 is upstream of the rotor downstream side 80 along the core flowpath 46. The rotor disk 74 extends radially from a radial inner side 82 of the bladed rotor 72 and its rotor disk 74 to a radial outer side 84 of the rotor disk 74. The rotor disk 74 extends circumferentially about the axis 36 providing the rotor disk 74 with a full-hoop (e.g., annular) geometry; see also FIG. 3. The rotor disk 74 of FIG. 2 includes an annular disk hub 86, an annular disk web 88 and an annular disk rim 90.

The disk hub 86 may form an inner mass of the rotor disk 74. The disk hub 86 is disposed at the rotor inner side 82 and forms a radial inner periphery of the bladed rotor 72 and its rotor disk 74. The disk hub 86 of FIG. 2 thereby forms and circumscribes an inner bore 92 of the bladed rotor 72, which inner bore 92 extends axially along the axis 36 through the bladed rotor 72 and its rotor disk 74. The disk hub 86 extends axially along the axis 36 between and to opposing axial sides 94 and 96 of the disk hub 86.

The disk web 88 is radially between and connects the disk hub 86 and the disk rim 90. The disk web 88 of FIG. 2, for example, projects radially out from (in an outward direction away from the axis 36) the disk hub 86 to the disk rim 90. This disk web 88 is formed integral with the disk hub 86 and the disk rim 90. The disk web 88 extends axially along the axis 36 between and to opposing axial sides 98 and 100 of the disk web 88. The web upstream side 98 may be axially recessed from the hub upstream side 94. The web downstream side 100 may be axially recessed from the hub downstream side 96. An axial width of the disk web 88 may thereby be different (e.g., thinner) than an axial width of the disk hub 86. The present disclosure, however, is not limited to such an exemplary arrangement.

The disk rim 90 is disposed at the disk outer side 84 and forms a radial outer periphery of the rotor disk 74. This disk rim 90 of FIG. 2 also forms a radial inner platform 102 of the bladed rotor 72. A radial outer surface 104 of the inner platform 102 forms an inner peripheral boundary of the core flowpath 46 (e.g., axially in FIG. 2) across the bladed rotor 72.

The disk rim 90 of FIG. 2 includes a rim base 106, an axial upstream flange 108 and an axial downstream flange 110. The rim base 106 is axially aligned with and radially outboard of the disk web 88. This rim base 106 connects the upstream flange 108 and the downstream flange 110 to the disk web 88. The upstream flange 108 projects axially along the axis 36 (in an upstream direction along the core flowpath 46) out from the rim base 106 and the disk web 88 to an axial distal end 112 of the upstream flange 108 at the rotor upstream side 78. The downstream flange 110 projects axially along the axis 36 (in a downstream direction along the core flowpath 46) out from the rim base 106 and the disk web 88 to an axial distal end 114 of the downstream flange 110 at the rotor downstream side 80. With this arrangement, the rim members 106, 108 and 110 collectively form the inner platform 102 and its platform outer surface 104. More particularly, the upstream flange 108 forms an axial upstream section of the platform outer surface 104. The downstream flange 110 forms an axial downstream section of the platform outer surface 104. The rim base 106 forms an axial intermediate section of the platform outer surface 104 extending axially between the upstream section of the platform outer surface 104 and the downstream section of the platform outer surface 104.

Referring to FIG. 3, the rotor blades 76 are arranged circumferentially (e.g., equispaced) around the axis 36 in an annular array; e.g., a circular array. This array of rotor blades 76 is disposed radially outboard of and circumscribes the rotor disk 74 and its inner platform 102. Each of the rotor blades 76 is formed integral with the rotor disk 74. The bladed rotor 72, more particularly, is formed as a single unitary body. Here, the term "unitary" may describe a body without severable parts. By contrast, a traditional bladed rotor includes rotor blades which are mechanically attached to a rotor disk through, for example, dovetail interfaces, firtree interfaces or other removeable attachments.

Figure 5:
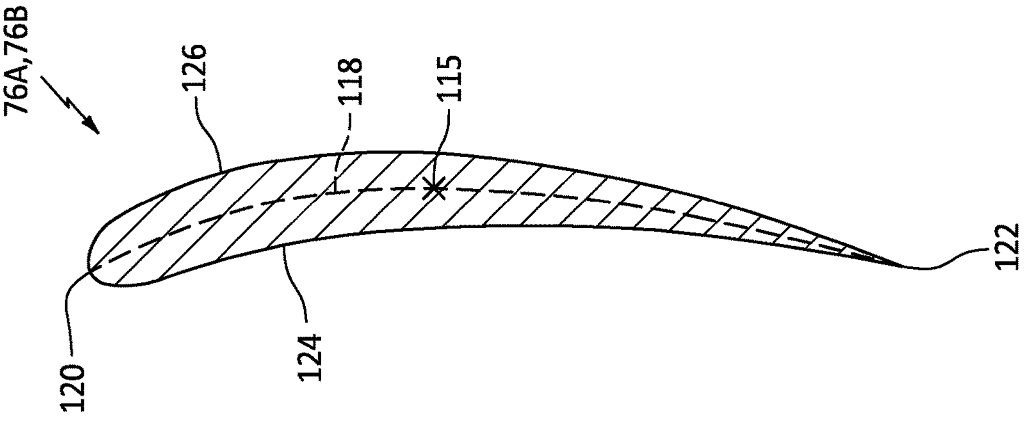
FIG. 5 is a cross-sectional schematic illustration of a rotor blade along line 5-5 in FIG. 4.
Figure 4:
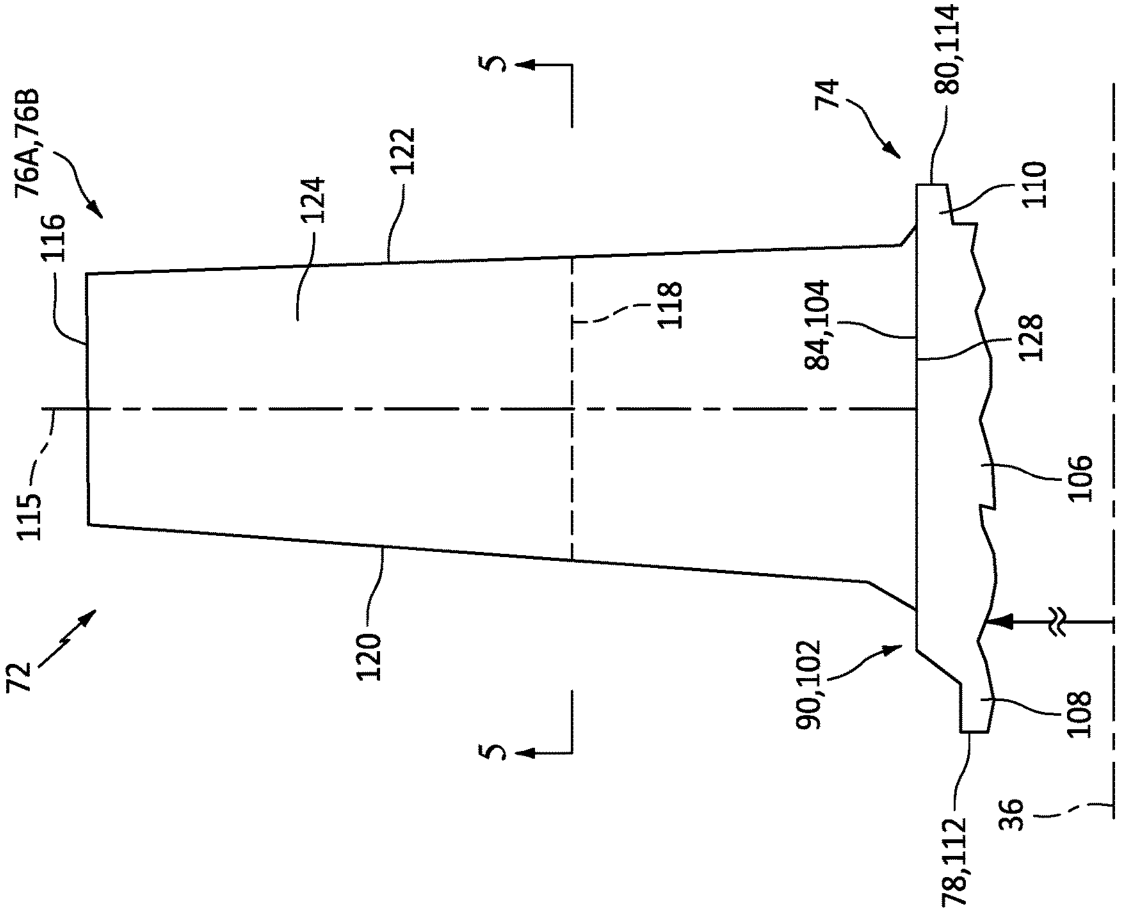
FIG. 4 is a side schematic illustration of a portion of the bladed rotor.

Referring to FIG. 4, each rotor blade 76 projects radially (e.g., spanwise along a span line 115 of the respective rotor blade 76) out from the rotor disk 74 and its platform outer surface 104 to a tip 116 of the respective rotor blade 76. Each rotor blade 76 extends longitudinally along a camber line 118 of the respective rotor blade 76 from a leading edge 120 of the respective rotor blade 76 to a trailing edge 122 of the respective rotor blade 76. Referring to FIG. 5, each rotor blade 76 extend laterally (e.g., in a direction perpendicular to the camber line 118) between and to a lateral first side 124 (e.g., a concave, pressure side) of the respective rotor blade 76 and a lateral second side 126 (e.g., a convex, suction side) of the respective rotor blade 76. These opposing lateral sides 124 and 126 extend longitudinally along the camber line 118 and meet at the leading edge 120 and the trailing edge 122. Referring to FIG. 4, each rotor element 120, 122, 124 and 126 (element 126 not visible in FIG. 4) may extend radially out from a base 128 of the respective rotor blade 76 at the inner platform 102 and its platform outer surface 104 to the blade tip 116.

Figure 7:
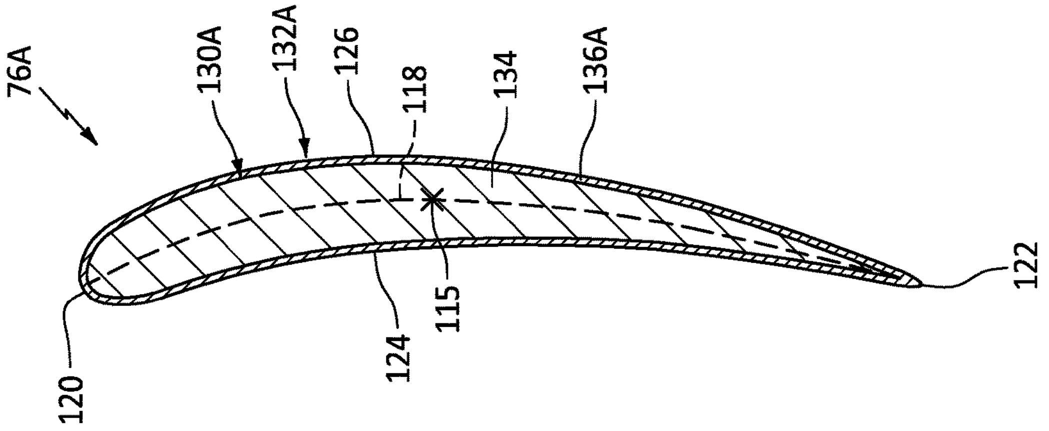
FIG. 7 is a cross-sectional schematic illustration of the first bladed rotor along line 7-7 in FIG. 6.
Figure 6:
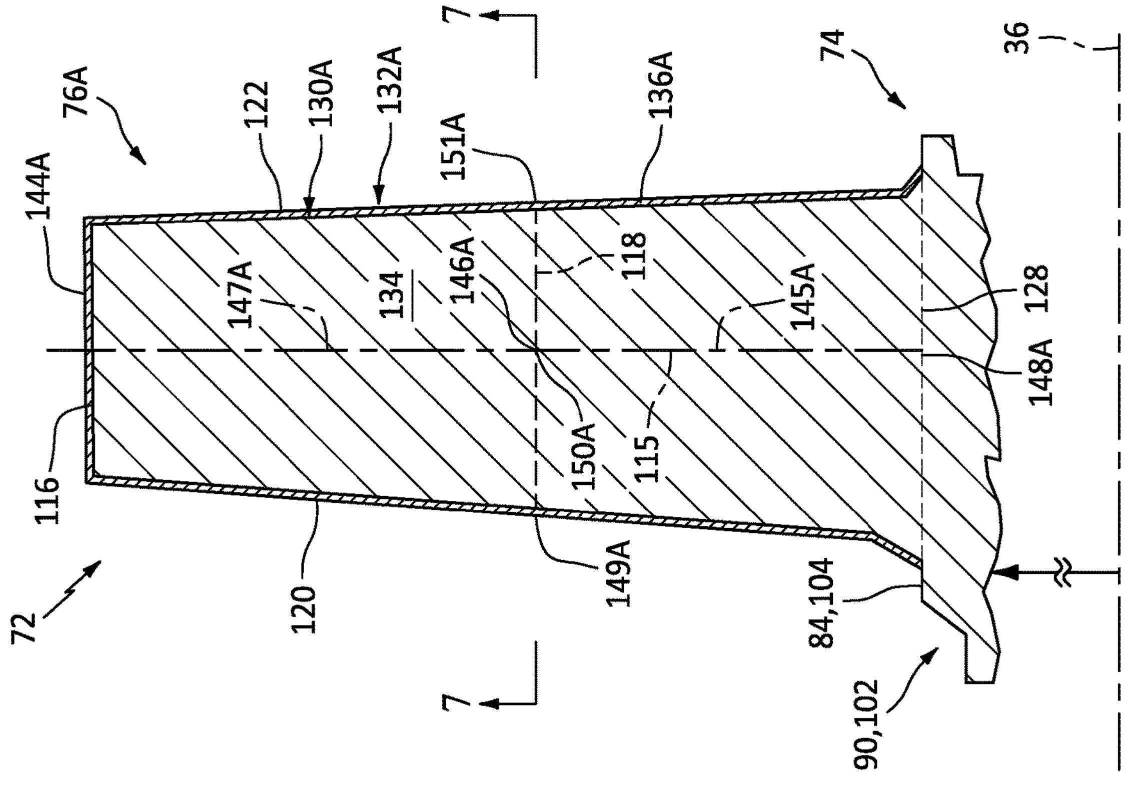
FIG. 6 is a side sectional schematic illustration of a portion of the bladed rotor through a first bladed rotor.

Referring to FIGS. 6 and 7, each first rotor blade 76A includes a first blade airfoil 130A and a first blade coating 132A. The first blade airfoil 130A is constructed from a substrate material 134. This substrate material 134 may be metal such as, but not limited to, a nickel (Ni) alloy. The first blade airfoil 130A of FIG. 6 is formed integral with the disk rim 90 and its inner platform 102. The first blade airfoil 130A of FIGS. 6 and 7 is configured to provide the respective first rotor blade 76A with its general shape such that, for example, an exterior of the first blade airfoil 130A closely matches (e.g., follows) an exterior of the respective first rotor blade 76A.

The first blade coating 132A is applied to and (e.g., completely) covers the exterior of the first blade airfoil 130A to (e.g., completely) form the exterior of the respective first rotor blade 76A. The first blade coating 132A of FIGS. 6 and 7, for example, is bonded to the exterior of the first blade airfoil 130A. This first blade coating 132A extends out from the exterior of the first blade airfoil 130A to the exterior of the respective first rotor blade 76A. The first blade coating 132A may thereby (e.g., completely) form one or more or all of the elements 116, 120, 122, 124 and/or 126 of the respective first rotor blade 76A.

The first blade coating 132A may be configured as an environmental coating (e.g., a sulfidation resistant coating, a hot corrosion resistant coating, etc.), a thermal barrier coating (TBC) and/or any other protective coating for protecting the underlying first blade airfoil 130A and its substrate material 134. This first blade coating 132A is formed from a first coating material 136A. Examples of the first coating material 136A include, but are not limited to, aluminide, platinum aluminide, a nickel based material and a ceramic. The first coating material 136A may be applied as one or more layers to form the first blade coating 132A. While the first blade coating 132A is generally described above as a single material coating (see FIG. 8A), it is contemplated the first blade coating 132A may alternatively be a coating system including multiple coating materials (see FIG. 8B). The first blade coating 132A of FIG. 8B, for example, may include a bond layer 138A between the underlining substrate material 134 and an external protective coating 140A.

Figure 8A:
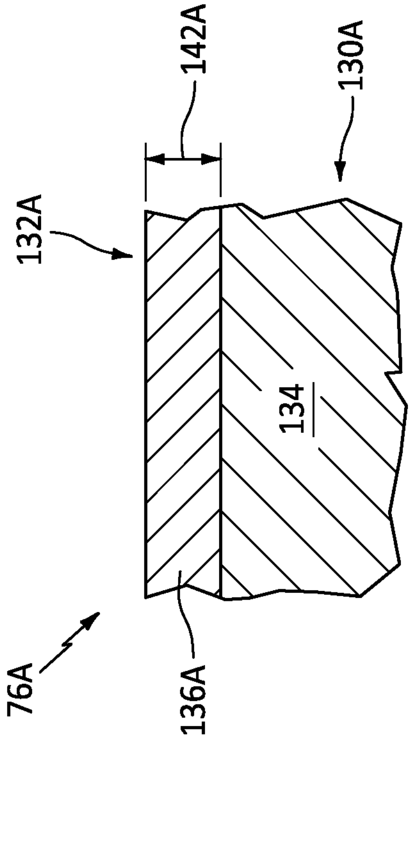
FIGS. 8A and 8B are partial sectional illustrations of the first bladed rotor with various first blade coating compositions.
Figure 8B:
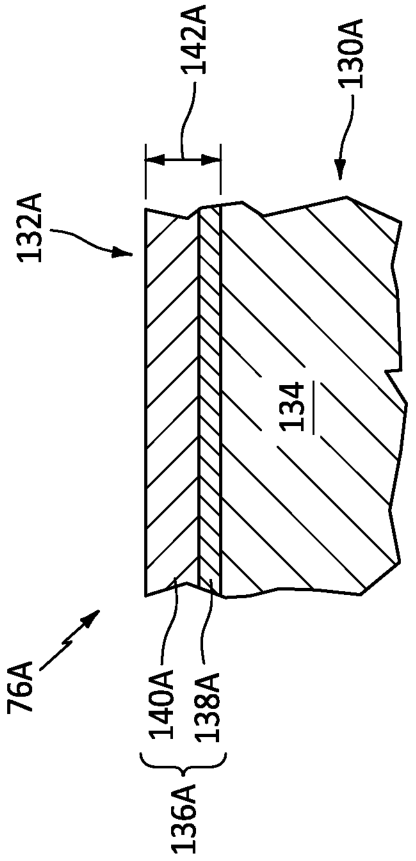

Referring to FIGS. 8A and 8B, the first blade coating 132A has a first coating thickness 142A. This first coating thickness 142A of FIGS. 8A and 8B is measured from the exterior of the underlying first blade airfoil 130A to the exterior of the respective first rotor blade 76A. The first blade coating 132A may uniformly cover the underlining first blade airfoil 130A and its substrate material 134. The first coating thickness 142A may thereby be uniform (the same) at various different (e.g., spanwise and/or longitudinal) reference locations 144A-151A along the respective first rotor blade 76A of FIGS. 6 and 7. These reference locations 144A-151A may include, but are not limited to:

- A tip reference location 144A disposed at (e.g., on, adjacent or proximate) the blade tip 116 of the respective first rotor blade 76A;
- An intermediate span reference location disposed at an intermediate location (e.g., a one-third span location 145A, a mid-span location 146A, a two-thirds span location 147A, etc.) radially/spanwise between the blade base 128 of the respective first rotor blade 76A and the blade tip 116 of the respective first rotor blade 76A;
- A base reference location 148A disposed at the blade base 128 of the respective first rotor blade 76A;
- A leading edge location 149A disposed at the leading edge 120 of the respective first rotor blade 76A;
- An intermediate longitudinal location disposed at an intermediate location (e.g., a one-third camber line location, a mid-camber line location 150A, a two-thirds camber line location, etc.) longitudinally between the leading edge 120 of the respective first rotor blade 76A and the trailing edge 122 of the respective first rotor blade 76A;
- A trailing edge location 151A disposed at the trailing edge 122 of the respective first rotor blade 76A; and/or
- Various other locations along one or more of the rotor blade elements 116, 120, 122, 124 and/or 126 of the respective first rotor blade 76A.

Of course, in other embodiments, the first coating thickness 142A may non-uniformly cover the underlining first blade airfoil 130A and its substrate material 134. The first coating thickness 142A, for example, may change (e.g., increase, decrease, fluctuate, etc.) as the respective first rotor blade 76A extends longitudinally along the camber line 118 and/or spanwise along the span line 115. The first coating thickness 142A at some or all of the reference locations 144A-151A may thereby be different from one another.

Figure 10:
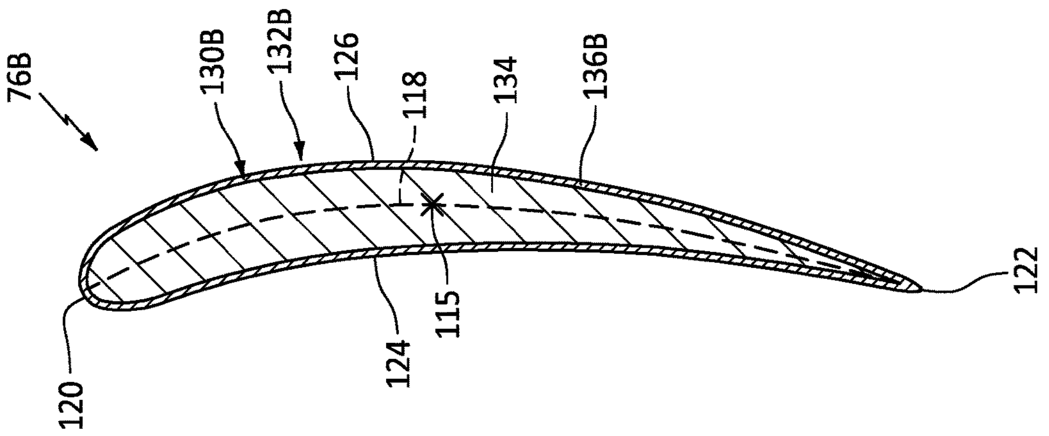
FIG. 10 is a cross-sectional schematic illustration of the second bladed rotor along line 10-10 in FIG. 9.
Figure 9:
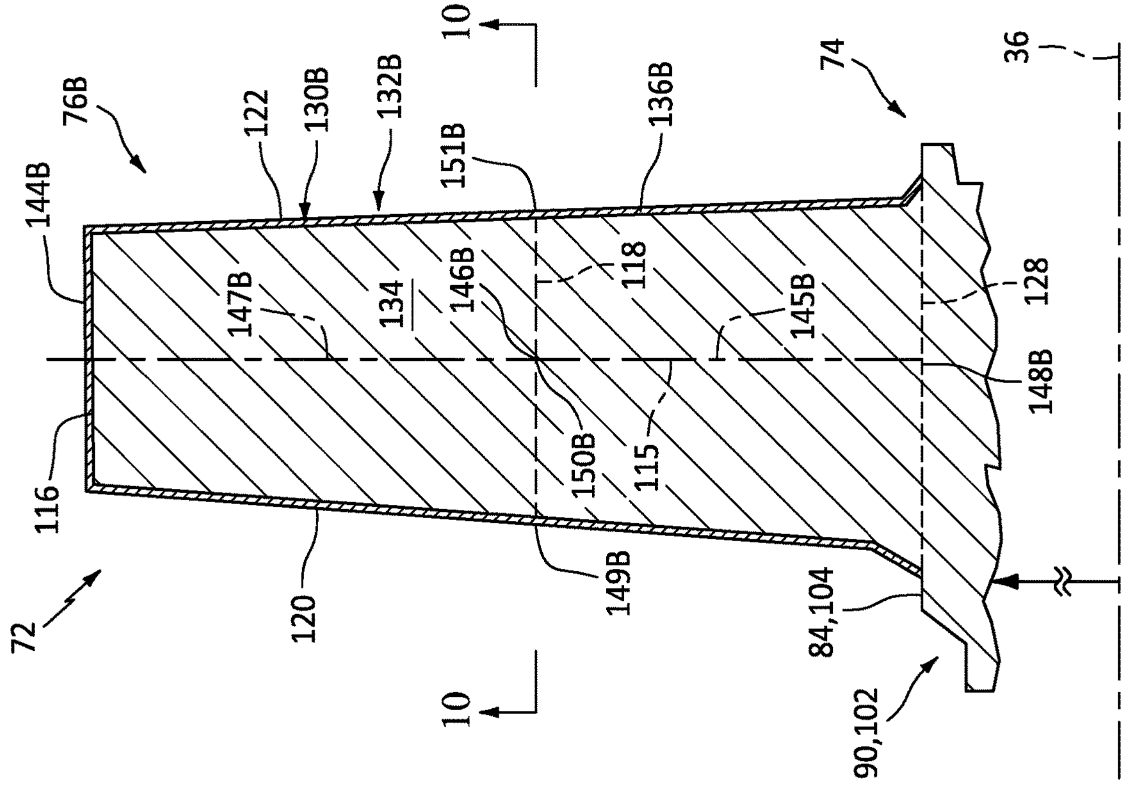
FIG. 9 is a side sectional schematic illustration of a portion of the bladed rotor through a second bladed rotor.

Referring to FIGS. 9 and 10, each second rotor blade 76B includes a second blade airfoil 130B and a second blade coating 132B. The second blade airfoil 130B is constructed from the substrate material 134, which is the same material from which the first blade airfoil 130A (see FIGS. 6 and 70 is constructed. The second blade airfoil 130B of FIG. 9 is formed integral with the disk rim 90 and its inner platform 102. The second blade airfoil 130B of FIGS. 9 and 10 is configured to provide the respective second rotor blade 76B with its general shape such that, for example, an exterior of the second blade airfoil 130B closely matches (e.g., follows) an exterior of the respective second rotor blade 76B. A configuration (e.g., shape, dimension, material makeup, etc.) of the second blade airfoil 130B may be the same as a configuration (e.g., shape, dimension, material makeup, etc.) of the first blade airfoil 130A of FIGS. 6 and 7.

The second blade coating 132B of FIGS. 9 and 10 is applied to and (e.g., completely) covers the exterior of the second blade airfoil 130B to (e.g., completely) form the exterior of the respective second rotor blade 76B. The second blade coating 132B of FIGS. 9 and 10, for example, is bonded to the exterior of the second blade airfoil 130B. This second blade coating 132B extends out from the exterior of the second blade airfoil 130B to the exterior of the respective second rotor blade 76B. The second blade coating 132B may thereby (e.g., completely) form one or more or all of the elements 116, 120, 122, 124 and/or 126 of the respective second rotor blade 76B.

The second blade coating 132B may be configured as an environmental coating (e.g., a sulfidation resistant coating, a hot corrosion resistant coating, etc.), a thermal barrier coating (TBC) and/or any other protective coating for protecting the underlying second blade airfoil 130B and its substrate material 134. This second blade coating 132B is formed from a second coating material 136B, which may be the same as or different than the first coating material 136A (see FIGS. 6 and 7). Examples of the second coating material 136B include, but are not limited to, aluminide, platinum aluminide, a nickel based material and a ceramic. The second coating material 136B may be applied as one or more layers to form the second blade coating 132B. While the second blade coating 132B is generally described above as a single material coating (see FIG. 11A), it is contemplated the second blade coating 132B may alternatively be a coating system including multiple coating materials (see FIG. 11B), which coating system may be the same as or different than the coating system of the first blade coating 132A (see FIG. 8B). The second blade coating 132B, for example, may include a bond layer 138B between the underlining substrate material 134 and an external protective coating 140B.

Figure 11A:
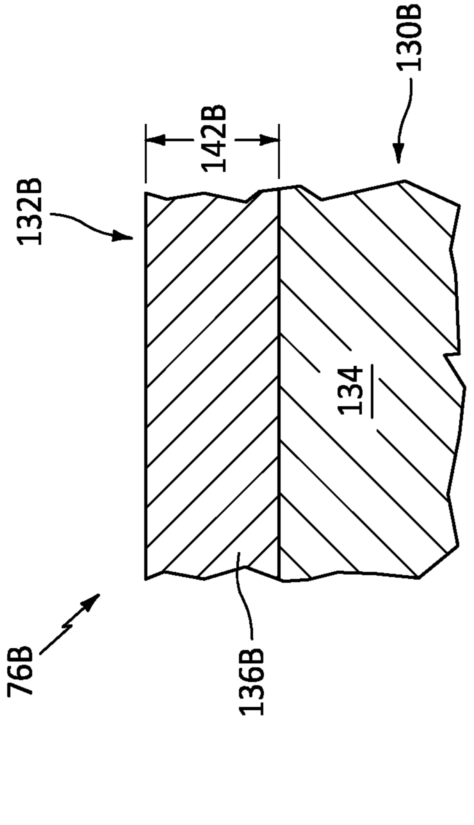
FIGS. 11A and 11B are partial sectional illustrations of the second bladed rotor with various second blade coating compositions.
Figure 11B:
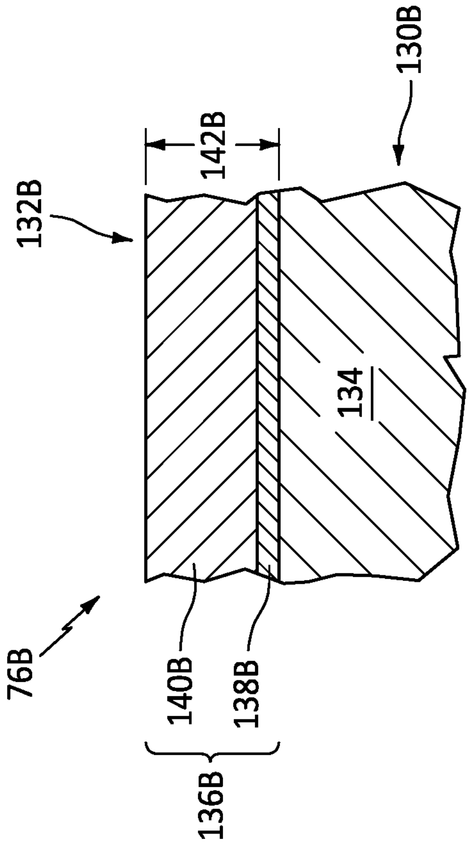

Referring to FIGS. 11A and 11B, the second blade coating 132B has a second coating thickness 142B. This second coating thickness 142B of FIGS. 11A and 11B is measured from the exterior of the underlying second blade airfoil 130B to the exterior of the respective second rotor blade 76B. The second blade coating 132B may uniformly cover the underlining second blade airfoil 130B and its substrate material 134. The second coating thickness 142B may thereby be uniform (the same) at various different (e.g., spanwise and/or longitudinal) reference locations 144B-151B along the respective second rotor blade 76B of FIGS. 9 and 10. These reference locations 144B-151B may include, but are not limited to:

- A tip reference location 144B disposed at (e.g., on, adjacent or proximate) the blade tip 116 of the respective second rotor blade 76B;
- An intermediate span reference location disposed at an intermediate location (e.g., a one-third span location 145B, a mid-span location 146B, a two-thirds span location 147B, etc.) radially/spanwise between the blade base 128 of the respective second rotor blade 76B and the blade tip 116 of the respective second rotor blade 76B;
- A base reference location 148B disposed at the blade base 128 of the respective second rotor blade 76B;
- A leading edge location 149B disposed at the leading edge 120 of the respective second rotor blade 76B;
- An intermediate longitudinal location disposed at an intermediate location (e.g., a one-third camber line location, a mid-camber line location 150B, a two-thirds camber line location, etc.) longitudinally between the leading edge 120 of the respective second rotor blade 76B and the trailing edge 122 of the respective second rotor blade 76B;
- A trailing edge location 151B disposed at the trailing edge 122 of the respective second rotor blade 76B; and/or
- Various other locations along one or more of the rotor blade elements 116, 120, 122, 124 and/or 126 of the respective second rotor blade 76B.

Of course, in other embodiments, the second coating thickness 142B may non-uniformly cover the underlining second blade airfoil 130B and its substrate material 134. The second coating thickness 142B, for example, may change (e.g., increase, decrease, fluctuate, etc.) as the respective second rotor blade 76B extends longitudinally along the camber line 118 and/or spanwise along the span line 115. The second coating thickness 142B at some or all of the reference locations 144B-151B may thereby be different from one another.

The second blade coating 132B is configured differently than the first blade coating 132A. For example, the second coating thickness 142B of FIGS. 11A and 11B at any one or more or all of the reference locations 144B-151B of FIGS. 9 and 10 may be different than (e.g., 1.5, 2, 3, 4 or more times thicker than) the first coating thickness 142A of FIGS. 8A and 8B at corresponding reference locations 144A-151A of FIGS. 6 and 7. In some embodiments, the second coating material 136B may be the same as the first coating material 136A. In other embodiments, the second coating material 136B may be different than (e.g., 1.5, 2, 3, 4 or more times denser than) the first coating material 136A. In another example, the second coating thickness 142B of FIGS. 11A and 11B may be equal to the first coating thickness 142A of FIGS. 8A and 8B at corresponding reference locations 144A-151A, 144B-151B. However, the second coating material 136B may be different than (e.g., denser than) the first coating material 136A.

By providing each first rotor blade 76A with a different coating configuration than each second rotor blade 76B, the first rotor blades 76A and the second rotor blades 76B may be provided with different properties; e.g., stiffnesses, center of mass locations, vibrational responses, etc. The various rotor blades 76 may thereby be strategically located about the axis 36 to tune a dynamic response of the bladed rotor 72. The rotor blades 76, for example, may be strategically located about the axis 36 to mistune the dynamic response of the bladed rotor 72 and reduce a vibratory response of the bladed rotor 72. Fundamental bending modes of the bladed rotor 72 may be mistuned for low nodal diameter (ND) excitations; e.g., from a first nodal diameter (ND1) excitation to an eighth nodal diameter (ND8) excitation. These fundamental bending modes include:

- Mode 1: Easy wise bending such as bending from pressure to suction side and vice versa;
- Mode 2: Stiff wise bending such as bending from leading edge to trailing edge and vice versa; and
- Mode 3: Torsional bending such as airfoil twisting about its stack line.

Referring to FIG. 3, the first rotor blades 76A are arranged into one or more first blade groupings 154A and the second rotor blades 76B are arranged into one or more second blade groupings 154B. Each of the first blade groupings 154A includes N1 number of the first rotor blades 76A, where the N1 number is an integer equal to or greater than two (2). Each second blade grouping 154B includes N2 number of the second rotor blades 76B, where the N2 number is an integer equal to or greater than two (2). The N2 number of FIG. 3 is equal to the N1 number. Moreover, a number M2 of the second blade groupings 154B of FIG. 3 is equal to a number M1 of the first blade groupings 154A. This number M1, M2 may be selected to correspond to a targeted nodal diameter for vibration reduction. For example, the number M1, M2 of FIG. 3 is equal to six to target sixth nodal diameter (ND6) excitation. Of course, the foregoing number M1, M2 and targeted nodal diameter is exemplary and the present disclosure is not limited thereto. For example, the bladed rotor 72 may alternatively be configured to target seventh or eighth nodal diameter (ND6) excitation, where the number M1, M2 of blade groupings is selected as seven (7) or eight (8), respectively.

Each first blade grouping 154A is associated with (e.g., defines) a circumferential first sector 156A about the axis 36. This first sector 156A (e.g., only) includes the first rotor blades 76A in the respective first blade grouping 154A; e.g., none of the second rotor blades 76B or other rotor blades. Each second blade grouping 154B is associated with a circumferential second sector 156B about the axis 36. This second sector 156B (e.g., only) includes the second rotor blades 76B in the respective second blade grouping 154B; e.g., none of the first rotor blades 76A or other rotor blades. The first blade groupings 154A/the first sectors 156A of FIG. 3 are interspersed with the second blade groupings 154B/the second sectors 156B about the axis 36 in a repeating pattern. Each first blade grouping 154A/each first sector 156A of FIG. 3, for example, is disposed circumferentially between and is next to a circumferentially neighboring pair of the second blade groupings 154B/the second sectors 156B. Similarly, each second blade grouping 154B/each second sector 156B of FIG. 3 is disposed circumferentially between and is next to a circumferentially neighboring pair of the first blade groupings 154A/the first sectors 156A.

Within the first blade grouping 154A'/the first sector 156A' of FIG. 3, the first rotor blade 76A' is disposed circumferentially adjacent the first rotor blade 76A". Within the second blade grouping 154B'/the second sector 156B' of FIG. 3, the second rotor blade 76B' is disposed circumferentially adjacent the second rotor blade 76B". The second blade grouping 154B'/the second sector 156B' is circumferentially adjacent the first blade grouping 154A'/the first sector 156A'. The first rotor blade 76A" is thereby circumferentially between and neighbors the first rotor blade 76A' and the second rotor blade 76B'. The second rotor blade 76B' is circumferentially between and neighbors the first rotor blade 76A" and the second rotor blade 76B". Of course, in other embodiments, one or more additional first rotor blades 76A may be disposed circumferentially between the first rotor blade 76A' and the first rotor blade 76A". Similarly, one or more additional second rotor blades 76B may be disposed circumferentially between the second rotor blade 76B' and the second rotor blade 76B".

Figure 12:
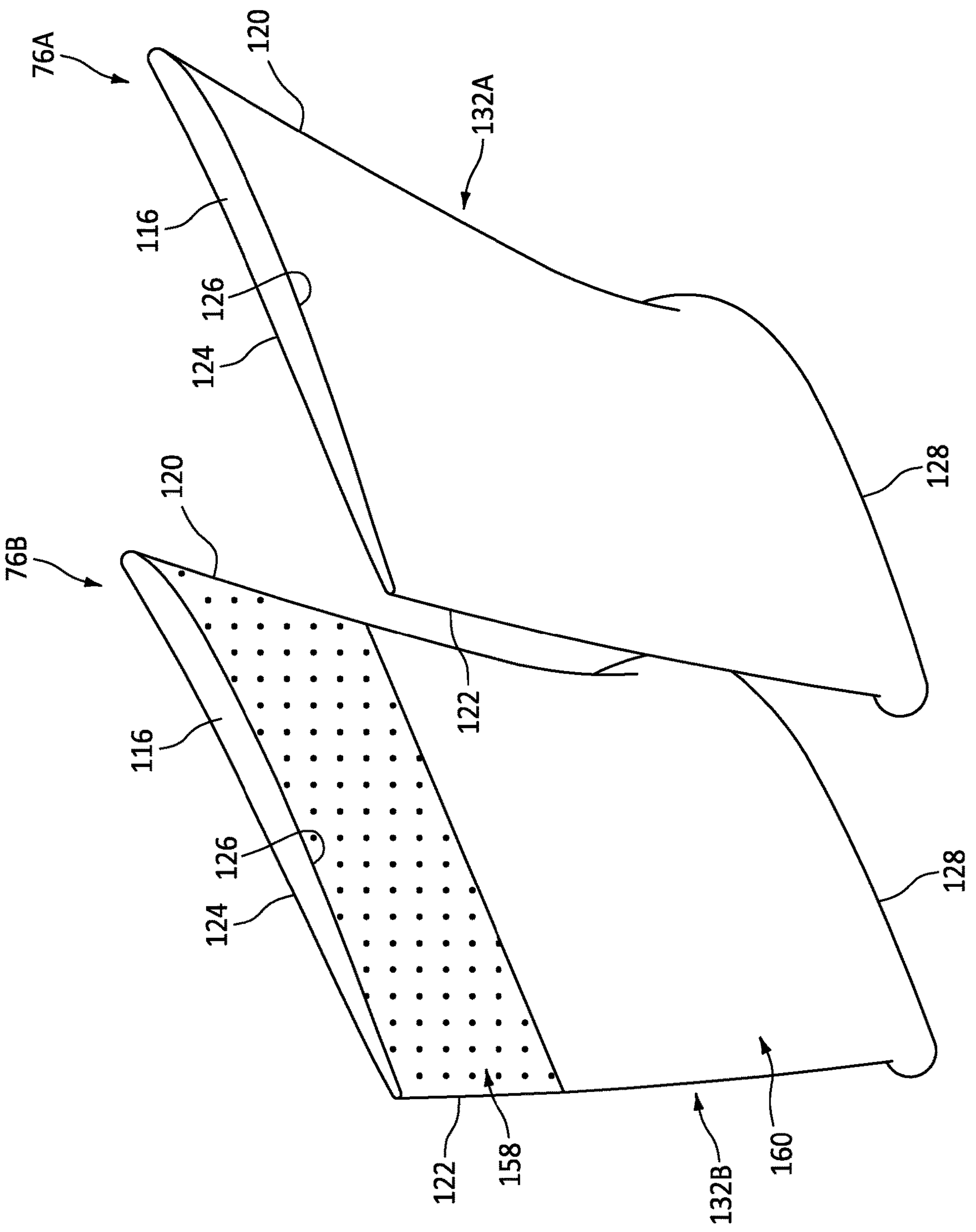
FIG. 12 is a perspective illustration of another second rotor blade adjacent the first rotor blade.
Figure 13:
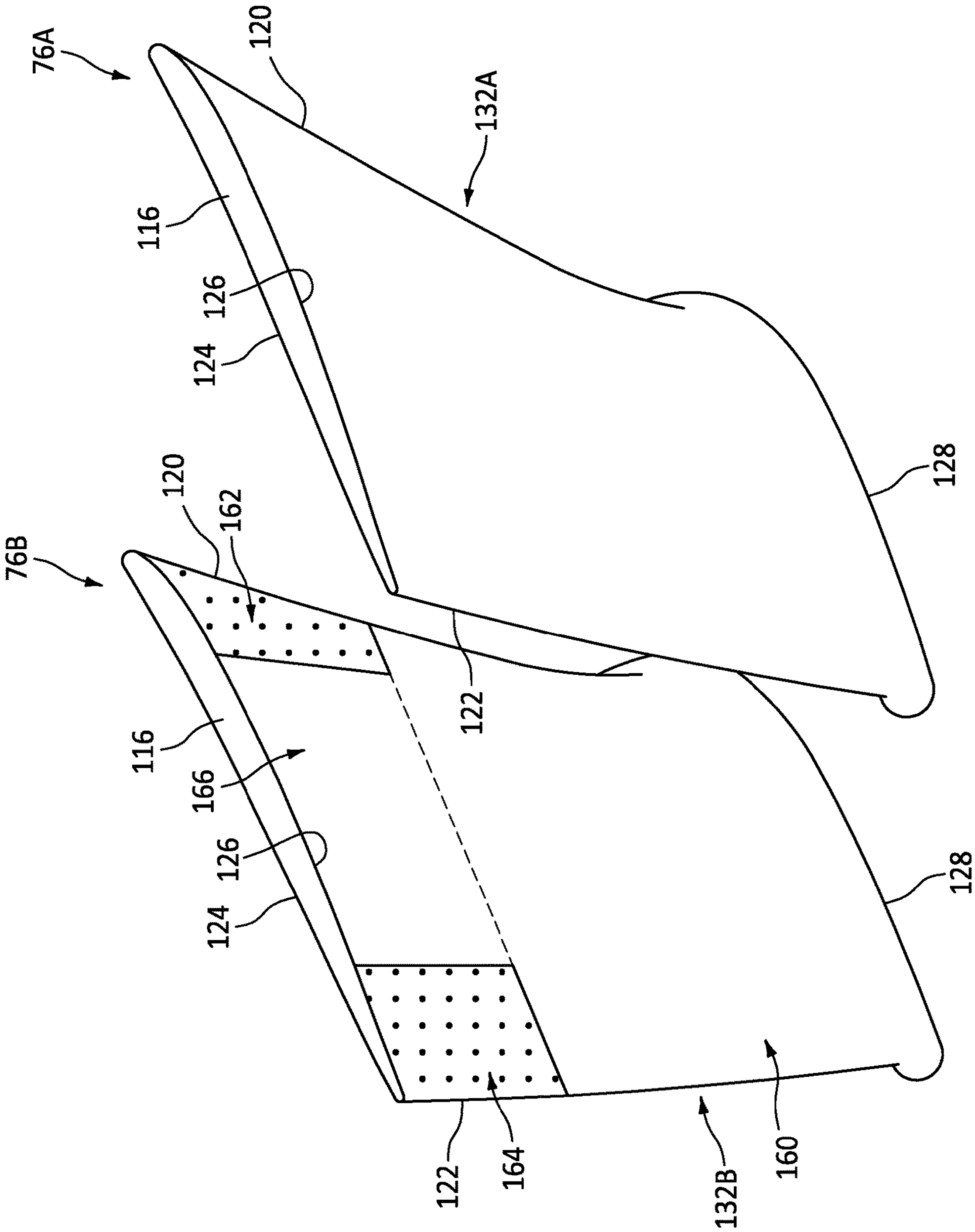
FIG. 13 is a perspective illustration of still another second rotor blade adjacent the first rotor blade.

In some embodiments, the first rotor blades 76A (e.g., see FIGS. 6 and 7) may have uniformly applied first blade coatings 132A and the second rotor blades 76B (e.g., see FIGS. 9 and 10) may have uniformly applied second blade coatings 132B. In other embodiments, while the first blade coatings 132A may be uniformly applied, the second blade coatings 132B may be non-uniformly applied. For example, referring to FIG. 12, the second blade coating 132B may be thicker along an entirety (or a portion) of a tip region 158 of each second rotor blade 76B than an inner base region 160 of the respective second rotor blade 76B. In another example, referring to FIG. 13, the second blade coating 132B may be thicker along at least a tip portion (or an entirety of) a leading edge region 162 and/or at least a tip portion (or an entirety of) a trailing edge region 164 of each second rotor blade 76B than at least a longitudinal intermediate portion 166 of the respective second rotor blade 76B. The configuration of the second blade coating 132B may thereby also or alternatively be varied from the configuration of the first blade coating 132A by selectively changing the second coating thickness 142B (see FIGS. 11A and 11B).

While the tuned rotor blades 76 are described above with respect to the integrally bladed rotor 72, the present disclosure is not limited thereto. It is contemplated, for example, the tuned rotor blades 76 may also provide mistuning for a bladed rotor (e.g., the HPT rotor 53 or the LPT rotor 54) with mechanical attachments removably securing those rotor blades to its rotor disk.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:

a bladed rotor rotatable about an axis, the bladed rotor including a rotor disk and a plurality of rotor blades projecting radially out from the rotor disk;

each of the plurality of rotor blades including an airfoil and a coating over the airfoil;

the plurality of rotor blades arranged circumferentially around the rotor disk into a plurality of blade groupings including a plurality of first blade groupings and a plurality of second blade groupings, each of the plurality of first blade groupings disposed circumferentially between a respective circumferentially neighboring pair of the plurality of second blade groupings, and each of the plurality of second blade groupings disposed circumferentially between a respective circumferentially neighboring pair of the plurality of first blade groupings;

the coating of each of the plurality of rotor blades in each of the plurality of first blade groupings having a first configuration; and the coating of each of the plurality of rotor blades in each of the plurality of second blade groupings having a second configuration that is different than the first configuration.

2. An apparatus for a gas turbine engine, comprising:

a bladed rotor rotatable about an axis, the bladed rotor including a rotor disk and a plurality of rotor blades arranged circumferentially around and connected to the rotor disk;

the plurality of rotor blades including a first rotor blade, a second rotor blade and a third rotor blade arranged circumferentially between and neighboring the first rotor blade and the second rotor blade;

the first rotor blade comprising a first coating;

the second rotor blade comprising a second coating that is different than the first coating; and the third rotor blade comprising a third coating that is identical to the first coating.

3. The apparatus of claim 2, wherein the plurality of rotor blades further includes a fourth rotor blade;

the second rotor blade is arranged circumferentially between and neighbors the third rotor blade and the fourth rotor blade; and the fourth rotor blade comprises a fourth coating that is identical to the second coating.

4. The apparatus of claim 2, wherein each of the plurality of rotor blades has a reference location;

the first coating has a first thickness at the reference location;

the second coating has a second thickness at the reference location that is different than the first thickness; and the third coating has a third thickness at the reference location that is equal to the first thickness.

5. The apparatus of claim 1, wherein the coating of each of the plurality of rotor blades in each of the plurality of first blade groupings has a first material makeup;

the coating of each of the plurality of rotor blades in each of the plurality of second blade groupings has a second material makeup that is different than the first material makeup.

6. The apparatus of claim 1, wherein each of the plurality of rotor blades has a reference location;

the coating of each of the plurality of rotor blades in each of the plurality of first blade groupings has a first thickness at the reference location; and the coating of each of the plurality of rotor blades in each of the plurality of second blade groupings has a second thickness at the reference location that is different than the first thickness.

7. The apparatus of claim 6, wherein
each of the plurality of rotor blades projects radially out from the rotor disk to a tip; and
the reference location is disposed at the tip.

8. The apparatus of claim 6, wherein
each of the plurality of rotor blades projects radially out from the rotor disk to a tip; and
the reference location is an intermediate location between the rotor disk and the tip.

9. The apparatus of claim 6, wherein the reference location is disposed adjacent the rotor disk.

10. The apparatus of claim 6, wherein
each of the plurality of rotor blades extends longitudinally between a leading edge and a trailing edge; and
the reference location is disposed at the leading edge.

11. The apparatus of claim 6, wherein
each of the plurality of rotor blades extends longitudinally between a leading edge and a trailing edge; and
the reference location is disposed at the trailing edge.

12. The apparatus of claim 6, wherein
each of the plurality of rotor blades extends longitudinally between a leading edge and a trailing edge; and
the reference location is an intermediate location between the leading edge and the trailing edge.

13. The apparatus of claim 1, wherein at least one of
the coating of each of the plurality of rotor blades in each of the plurality of first blade groupings is uniformly applied with each of the plurality of rotor blades in each of the plurality of first blade groupings; or
the coating of each of the plurality of rotor blades in each of the plurality of second blade groupings is uniformly applied with each of the plurality of rotor blades in each of the plurality of second blade groupings.

14. The apparatus of claim 1, wherein
the coating of each of the plurality of rotor blades in each of the plurality of first blade groupings is uniformly applied with each of the plurality of rotor blades in each of the plurality of first blade groupings; and
the coating of each of the plurality of rotor blades in each of the plurality of second blade groupings is non-uniformly applied with each of the plurality of rotor blades in each of the plurality of second blade groupings.

15. The apparatus of claim 1, wherein the bladed rotor is configured as an integrally bladed rotor.

16. The apparatus of claim 1, wherein the bladed rotor is configured as a turbine rotor for the gas turbine engine.

17. The apparatus of claim 2, wherein the bladed rotor is configured as an integrally bladed rotor.

18. The apparatus of claim 2, wherein the bladed rotor is configured as a turbine rotor for the gas turbine engine.

* * * * *